United States Patent
Horii et al.

(10) Patent No.: US 7,735,590 B2
(45) Date of Patent: Jun. 15, 2010

(54) SADDLE RIDE, FUEL CELL POWERED VEHICLE

(75) Inventors: Yoshiyuki Horii, Saitama (JP); Masamoto Ito, Saitama (JP); Yohei Makuta, Saitama (JP); Jun Morimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 12/047,153

(22) Filed: Mar. 12, 2008

(65) Prior Publication Data

US 2008/0236924 A1 Oct. 2, 2008

(30) Foreign Application Priority Data

Mar. 30, 2007 (JP) ............................. 2007-094247
Mar. 30, 2007 (JP) ............................. 2007-094249

(51) Int. Cl.
*B60K 11/04* (2006.01)
(52) U.S. Cl. ..................... 180/68.4; 180/65.1; 180/68.6
(58) Field of Classification Search ................ 180/65.1, 180/68.1, 68.4, 68.5, 68.6, 210, 212, 220
See application file for complete search history.

(56) References Cited

U.S. PATENT DOCUMENTS

| 2006/0040145 A1* | 2/2006 | Tokumura et al. ............. 429/12 |
|---|---|---|
| 2006/0040154 A1* | 2/2006 | Makuta et al. ................. 429/26 |
| 2006/0060400 A1* | 3/2006 | Iwashita et al. ............ 180/65.3 |
| 2007/0074682 A1* | 4/2007 | Makuta ...................... 123/41.1 |
| 2007/0122671 A1* | 5/2007 | Shimizu et al. ............... 429/26 |
| 2008/0093148 A1* | 4/2008 | Takahashi ................... 180/220 |
| 2008/0246315 A1* | 10/2008 | Ito ........................... 297/215.1 |
| 2009/0020352 A1* | 1/2009 | Horii et al. .................. 180/212 |

FOREIGN PATENT DOCUMENTS

| JP | 2002-37167 A | 2/2002 |
|---|---|---|
| JP | 2007-59127 A | 3/2007 |

* cited by examiner

*Primary Examiner*—Lesley Morris
*Assistant Examiner*—Tashiana Adams
(74) *Attorney, Agent, or Firm*—Birch, Stewart, Kolasch & Birch, LLP (57) ABSTRACT

A fuel cell powered vehicle includes radiators disposed on left and right sides on the skew rear side of a front wheel in relation to the vehicle body front-rear direction. A secondary battery is disposed between the left and right radiators. A thin plate-shaped inner cowl is disposed between the secondary battery and the front wheel. Duct mechanisms surrounding the radiators are provided on the left and right sides of the inner cowl and inside a cowling. Each duct mechanism includes introduction ports for a running airflow, and a discharge port that is fitted with variable-type louvers. A voltage converter unit is accommodated in a straddled part of the vehicle. Radiating fins of the voltage converter include plate-like members erected in the vehicle body front-rear direction that are directed toward the upper side of the vehicle body and are exposed to the exterior of the vehicle body.

20 Claims, 8 Drawing Sheets

SADDLE RIDE, FUEL CELL POWERED VEHICLE

CROSS-REFERENCE TO RELATED APPLICATION

The present application claims priority under 35 U.S.C. §119 to Japanese Patent Application Nos. 2007-094249 and 2007-094247, both filed Mar. 30, 2007, the entire contents of which are hereby incorporated by reference.

BACKGROUND OF THE INVENTION

1. Field of the Invention

The present invention relates to a saddle ride, fuel cell powered vehicle, and particularly to a saddle ride, fuel cell powered vehicle having radiator and surrounding configurations such that the cooling performance of radiators can be enhanced. In addition, the present invention relates to a fuel cell powered vehicle such that the cooling effect on a voltage converter unit can be enhanced with a simple configuration and that the weight balance of the vehicle body can be enhanced through the layout position of the voltage converter unit.

2. Description of Background Art

Conventionally, there have been known fuel cell powered vehicles on which a fuel cell for generating electric power by a chemical reaction between hydrogen and oxygen is mounted and which are driven to run by the electric power supplied from the fuel cell. Such a fuel cell powered vehicle is ordinarily provided with a radiator for radiating the heat generated by the fuel cell.

Japanese Patent Laid-open No. 2007-59127 discloses a saddle ride, fuel cell powered motorcycle in which, in addition to a radiator attached to a vehicle body frame on the rear side of a front wheel, another radiator is disposed on the front side of a head pipe of the vehicle body frame.

In a saddle ride, vehicle having little surplus space, unlike a four-wheel vehicle or the like having a compartment, it is desirable that a radiator is as small as possible. Besides, in a radiator of the type in which heat is radiated by passage of a running airflow or the like, the cooling performance is heavily influenced by such factors as the layout position of the radiator in relation to the vehicle body. Thus, there is a request for development of a technique for enhancing the cooling performance of a radiator without enlarging the radiator.

In addition, fuel cell powered vehicles have been known in which a voltage converter unit is provided for converting the voltage supplied from the fuel cell to a voltage suitable for driving a running motor or electrical equipment. Since the voltage converter unit generates heat at the time of voltage conversion, various techniques are investigated for appropriately treating the heat thus generated.

Japanese Patent Laid-open No. 2002-37167 discloses a configuration in which a hydrogen fuel container made of a hydrogen occluding alloy is disposed in the proximity to the voltage converter unit (DC-DC converter), whereby the heat of the voltage converter unit can be transferred to the hydrogen fuel container In the technology of Japanese Patent Laid-open No. 2002-37167, however, in the case of introducing the running airflow into the inside of the vehicle body in order to sufficiently cool the voltage converter unit, it has been necessary to provide a vehicle body cover or the like with a baffle plate or the like. In addition, it is desired that the layout position of the voltage converter unit be set taking into account the weight balance of the vehicle body.

SUMMARY AND OBJECTS OF THE INVENTION

It is an object of the present invention to provide, for solving the problem involved in the prior art, a saddle ride, fuel cell powered vehicle having radiator and surrounding configurations such that the cooling performance of a radiator can be enhanced. Another object of the present invention is to provide a fuel cell powered vehicle such that the cooling effect on a voltage converter unit can be enhanced with a simple configuration and that the weight balance of the vehicle body can be enhanced through the layout position of the voltage converter unit.

In order to attain the above object, according to an embodiment of the present invention, a saddle ride, fuel cell powered vehicle is driven to run by electric power supplied from a fuel cell. The vehicle includes a secondary battery for reserving the electric power supplied from the fuel cell, and a radiator as a heat radiator for cooling water for the fuel cell. Two such radiators are disposed on the left and right sides on the skew rear side of a front wheel in relation to the vehicle body front-rear direction; and the secondary battery is disposed between the left and right radiators.

In addition, according to an embodiment of the present invention, a thin plate-like inner cowl is disposed between the secondary battery and the front wheel.

In addition, according to an embodiment of the present invention, the saddle ride, fuel cell powered vehicle further includes a cowling for covering the front side of the vehicle, and duct mechanisms for surrounding the radiators; and each of the duct mechanisms has an introduction port and a discharge port for a running airflow, and the duct mechanisms are disposed on the left and right sides of the inner cowl and on the inside of the cowling.

Further, according to an embodiment of the present invention, the discharge port is fitted with louvers by which the direction of an airflow discharged to the exterior of the vehicle body after passing through the radiator can be arbitrarily changed between a direction toward the driver and a direction toward the vehicle body outer side.

Still further, according to an embodiment of the present invention, the fuel cell powered vehicle includes a voltage converter unit for converting the voltage of electric power generated by a fuel cell to a predetermined voltage, a steering handle for steering a front wheel, and a seat on which the driver is to be seated. A driver straddled part is provided between the steering handle and the seat, the voltage converter unit is fitted with radiating fins, and the voltage converter unit is accommodated in the straddled part with the radiating fins directed to the upper side of the vehicle body.

Still further, according to an embodiment of the present invention, the straddled part is formed between left and right footrests on which the driver's feet are to be put, in the vehicle width direction.

Still further, according to an embodiment of the present invention, the left and right radiators as heat radiators for cooling water for the fuel cell are provided on the vehicle left and right sides, and the voltage converter unit is disposed between the left and right radiators.

Still further, according to an embodiment of the present invention, the voltage converter unit is so disposed that the radiating fins are exposed to the exterior of the vehicle body.

Still further, according to an embodiment of the present invention, the radiating fins are so disposed as to extend in the vehicle body front-rear direction.

Effects of the invention include the following:

According to the embodiment of the present invention, the saddle ride, fuel cell powered vehicle includes a secondary battery for reserving the electric power supplied from the fuel cell, and a radiator as a heat radiator for cooling water for the fuel cell; two such radiators are disposed on the left and right sides on the skew rear side of a front wheel in relation to the vehicle body front-rear direction; and the secondary battery is disposed between the left and right radiators. Therefore, the running airflow impinging on the radiators is not blocked by the front wheel, and the running airflow is permitted to collide on the radiators efficiently. As a result, the cooling performance of the radiator is enhanced, and the radiator can be reduced in size while securing the same cooling performance. In addition, that space in the center in the vehicle width direction which is secured by distributingly disposing the radiators on the left and right sides can be effectively utilized as a space in which to dispose the secondary battery. Further, with the secondary battery disposed rather on the vehicle body front side, it becomes easy to increase the proportion of the vehicle weight distributed on the front wheel side and, hence, the front-rear weight balance of the vehicle body can be enhanced, even in a vehicle body configuration in which the vehicle weight tends to be distributed more on the rear wheel side than on the front wheel side.

According to the embodiment of the present invention, a thin plate-like inner cowl is disposed between the secondary battery and the front wheel. This makes it possible to protect the secondary battery from shocks in a central area, and to protect the secondary battery from water and dust.

According to the embodiment of the present invention, the saddle ride, fuel cell powered vehicle further includes a cowling for covering the front side of the vehicle, and duct mechanisms for surrounding the radiators; each of the duct mechanisms has an introduction port and a discharge port for a running airflow, and the duct mechanisms are disposed on the left and right sides of the inner cowl and on the inside of the cowling. The duct mechanisms permit the running airflow to efficiently impinge on the radiators disposed on the inside of the cowling.

According to the embodiment of the present invention, the discharge port is fitted with louvers by which the direction of an airflow discharged to the exterior of the vehicle body after passing through the radiator can be arbitrarily changed between a direction toward the driver and a direction toward the vehicle body outer side. Therefore, it becomes possible to make a free choice between a mode in which a discharge airflow warmed up by passing through the radiator is utilized for heating by causing it to impinge on the driver and a mode in which the discharge airflow is directed toward the vehicle body outer side and is so discharged as not to impinge on the driver.

According to the embodiment of the present invention, a driver straddled part is provided between the steering handle and the seat, the voltage converter unit is fitted with radiating fins, and the voltage converter unit is accommodated in the straddled part with the radiating fins directed to the upper side of the vehicle body. Therefore, the radiating fins are placed at a position near the exterior of the vehicle body, whereby the cooling effect on the voltage converter unit can be enhanced. In addition, since the voltage converter unit serving as a heavyweight body is accommodated in the straddled part located rather on the vehicle body front side, it becomes easy to increase the proportion of the vehicle weight distributed on the front wheel side, so that the front-rear weight balance of the vehicle body can be enhanced.

According to the embodiment of the present invention, the straddled part is formed between left and right footrests on which the driver's feet are to be put, in the vehicle width direction. Therefore, it is possible to obtain a fuel cell powered vehicle in which the cooling effect on the voltage converter unit is enhanced while following the general shape of the motor scooter type saddle ride vehicle.

According to the embodiment of the present invention, left and right radiators as heat radiators for cooling water for the fuel cell are provided on the vehicle left and right sides, and the voltage converter unit is disposed between the left and right radiators. Therefore, the airflow warmed by passing through the radiator is prevented from impinging on the voltage converter unit, and the running airflow coming from the vehicle front side can be permitted to the voltage converter unit.

According to the embodiment of the present invention, the voltage converter unit is so disposed that the radiating fins are exposed to the exterior of the vehicle body. As a result, the radiating fins make direct contact with the outside air, and the cooling effect on the voltage converter unit can be enhanced further.

According to the embodiment of the present invention, the radiating fins are so disposed as to extend in the vehicle body front-rear direction. This ensures that the direction of the radiating fins coincides with the direction of the running airflow, and it becomes easier for the outside air making contact with the radiating fins to flow, whereby the cooling effect can be enhanced further.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
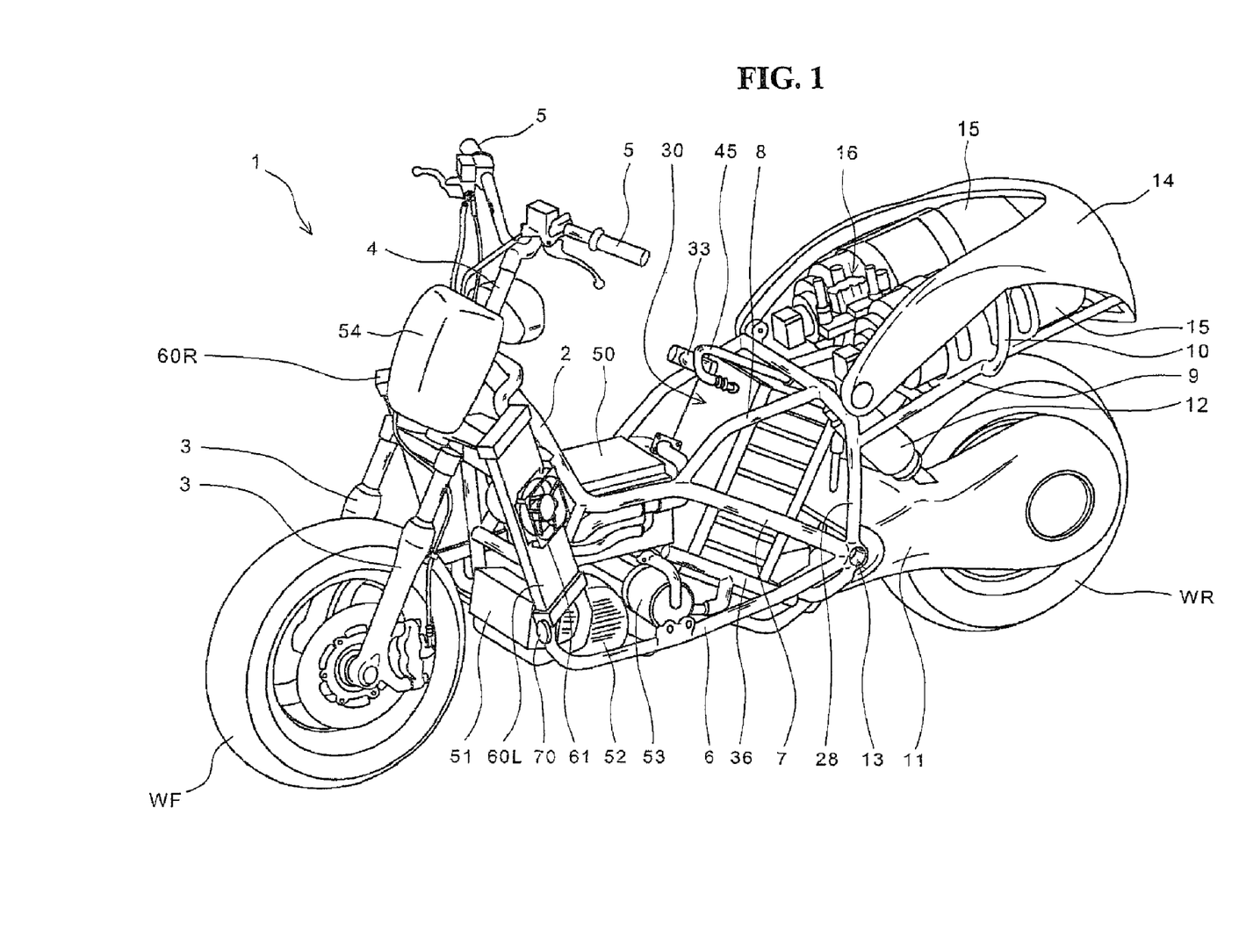
FIG. 1 is a perspective view of a fuel cell powered vehicle according to an embodiment of the present invention.
Figure 2:
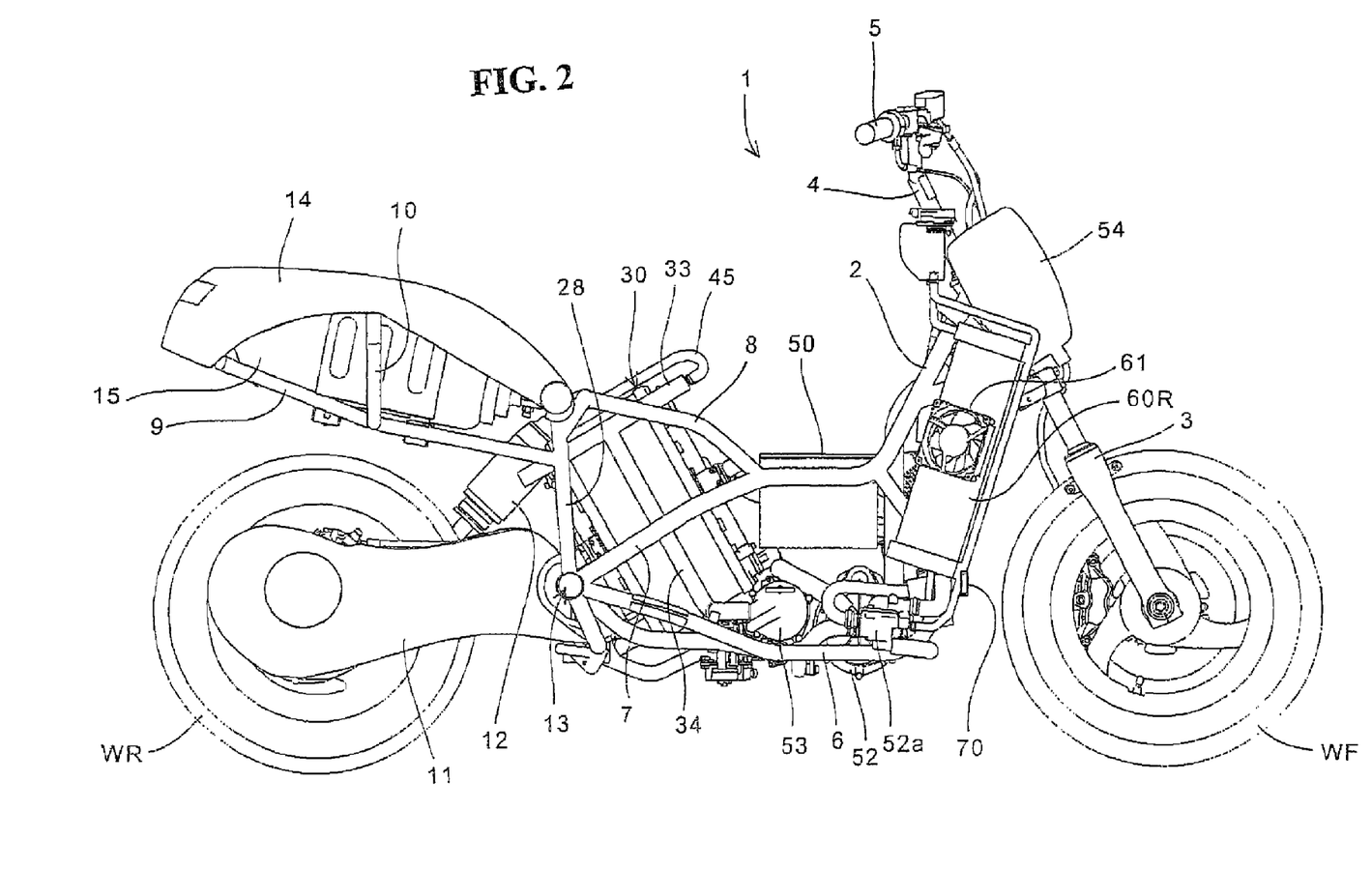
FIG. 2 is a right side view of the fuel cell powered vehicle according to an embodiment of the present invention.

FIG. 1 is a perspective view of a fuel cell powered vehicle 1 according to an embodiment of the present invention. FIG. 2 is a right side view of the fuel cell powered vehicle 1. The fuel cell powered vehicle 1 as a saddle ride, motorcycle has a fuel cell power generation system including a cell stack (inclusive of electrodes, a separator, an electrolyte membrane and the like) having a plurality of cells stacked, a fuel (hydrogen) gas supply system for supplying hydrogen gas as a fuel to the cell stack, and a reactant gas supply system for supplying an oxygen-containing reactant gas (air) to the cell stack. Hereinafter, a substantially rectangular parallelepiped casing containing the cell stack therein will, as a whole, be referred to as a fuel cell 30.

The fuel cell powered vehicle 1 has a framework including a main frame 2 to which a head pipe for turnably supporting a handle post 4 of a steering handle 5 is joined, an under frame 6 joined to the head pipe and extending rearwards on the lower side of a vehicle body, a guard pipe 7 covering the fuel cell 30 disposed substantially at the center of the vehicle body, an upper pipe 8 disposed on the upper side of the guard pipe 7, a connecting pipe 28 extending upwards from a rear end part of the guard pipe 7 and connected to the upper pipe 8, and a rear frame 9 for supporting two hydrogen cylinders 15 on the rear side of the upper pipe 8. A left-right pair type front fork 3 for rotatably supporting a front wheel WF is mounted on the lower side of the handle post 5, and the steering angle of the front wheel WF can be changed by turning the steering handle 5.

A swing arm 11 suspended from the vehicle body by a rear cushion 12 is swingably supported on a pivot shaft 13 provided at a rear end part of the under frame 6. A driving motor (not shown) as a power source of the fuel cell powered vehicle 1 is incorporated in the swing arm 11, and a rear wheel WR is driven by the driving motor.

A scroll type compressor 52 as a supercharger for forcibly feeding the reactant gas under pressure, a humidifier 53 for controlling the humidity of the reactant gas, the fuel cell 30 having the substantially rectangular parallelepiped shape, a voltage converter unit (VCU) 50 for raising or lowering the power generation voltage of the fuel cell 30 so as to convert the voltage to a predetermined voltage, and a secondary battery 51 for storing the electric power supplied from the fuel cell 30 are disposed in a space surrounded by the main frame 2 and the under frame 6.

In addition, a left-right pair of radiators 60L, 60R for cooling the cooling water for the fuel cell 30 are mounted on the vehicle body front side of the main frame 2, and motor-driven cooling fans 61 for enhancing the cooling effect are disposed at back surface parts of the radiators 60L, 60R.

The fuel cell 30 being rectangular in side view is mounted to the vehicle body in the state of having the rectangular side-view shape as a vertically elongate shape and being inclined toward the vehicle body rear side. The fuel cell 30 is fitted with a fuel gas pipe 45 for supplying a hydrogen-containing fuel gas, a suction-side manifold 33 as a piping for supplying an oxygen-containing reactant gas, and a discharge-side manifold 36 as a piping for discharging both an unreacted gas having passed through the cell stack and reaction product water.

The substantially cylindrical hydrogen cylinders 15 are supported by the rear frame 9 and a guide pipe 10 on the upper side of the rear wheel (drive wheel) WR in the condition where the valve side thereof to be connected to a hydrogen cylinder regulator 16 is directed toward the vehicle body front side. Hydrogen contained in the hydrogen cylinders 15 is supplied through the fuel gas pipe 45 to the fuel cell 30 after its pressure is lowered by the hydrogen cylinder regulator 16, which is electrically controlled based on data sent from various sensors and the like. Incidentally, a rear cowl 14 as a part of an armor member is disposed on the upper side of the rear frame 9 so as to cover the hydrogen cylinders 15.

An air cleaner box 54 for filtration of the outside air is provided on the vehicle body front side of the handle post 4, and the air introduced through the air cleaner box 54 is fed under pressure to the humidifier 53 by the scroll type compressor 52. The reactant gas appropriately humidified by the humidifier 53 is fed under pressure to the fuel cell 30 through a reactant gas pipe 34 and the suction-side manifold 33 connected to the reactant gas pipe 34.

A left-right pair of motor-driven fans 70 for positively introducing the outside air to the inside of the armor member (not shown) formed from resin sheets or the like and covering the vehicle body, i.e., into the inside of the vehicle body are mounted on the lower side of the radiators 60L, 60R. In addition, a thermostat 52a for keeping the temperature of the cooling water for the fuel cell 30 at a predetermined value is mounted on the right side in the vehicle width direction of the scroll type compressor 52.

Figure 3:
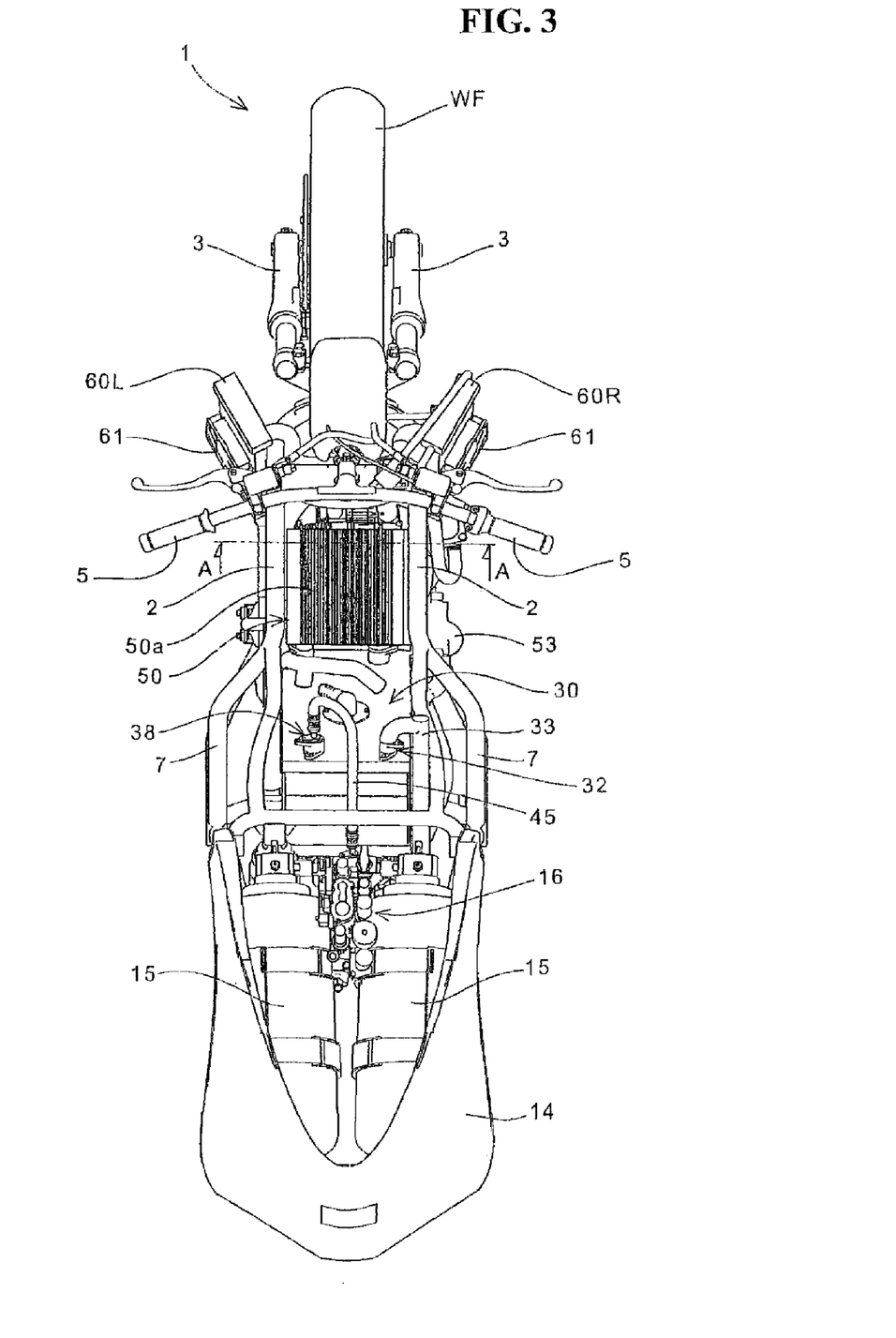
FIG. 3 is a top plan view of a fuel cell powered vehicle according to an embodiment of the present invention.
Figure 4:
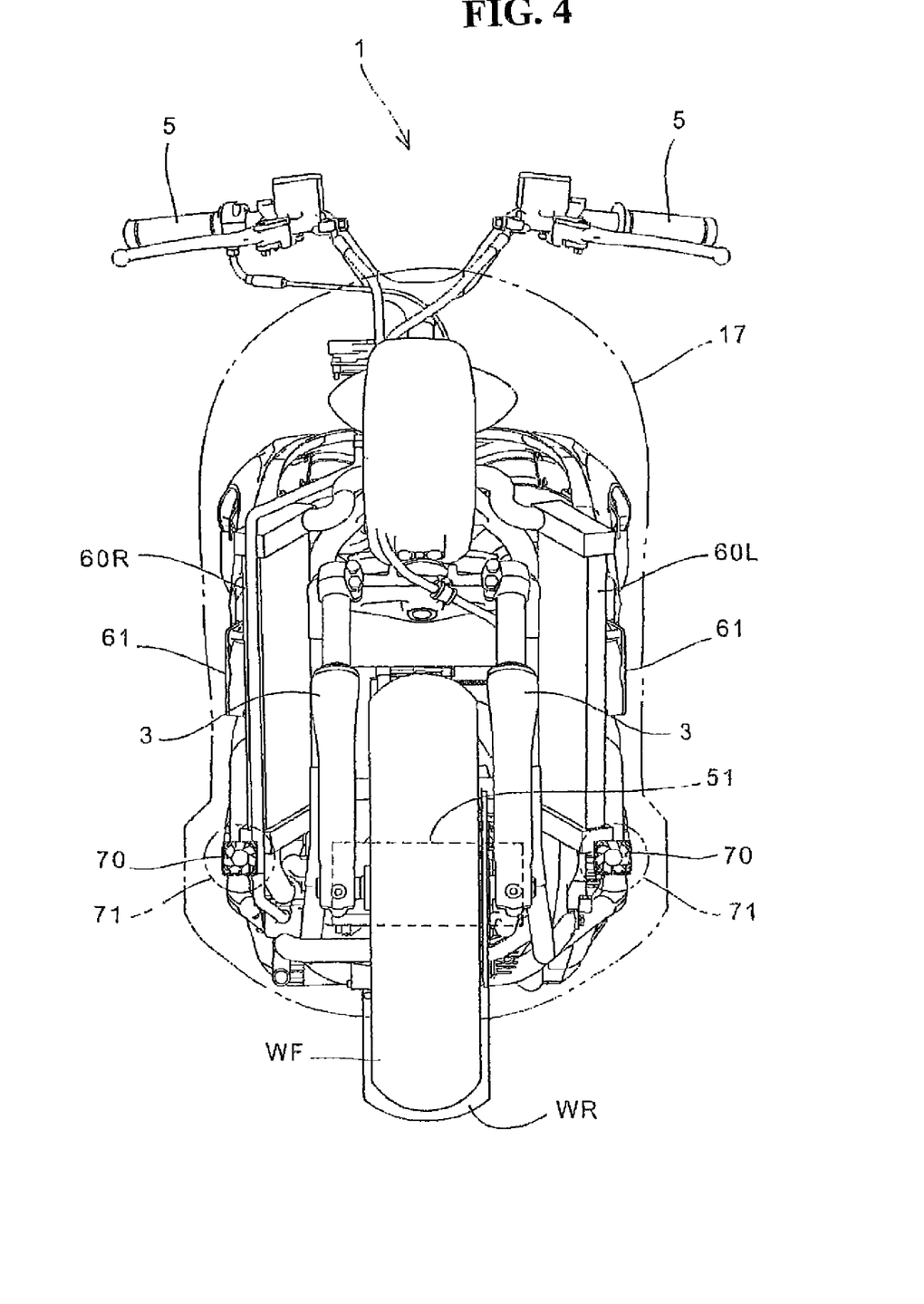
FIG. 4 is a front view of a fuel cell according to an embodiment of the present invention.

FIGS. 3 and 4 are respectively a top plan view and a front view of the fuel cell powered vehicle 1. The same symbols as used above denoted the parts which are the same as or equivalent to those shown above. The fuel cell 30 disposed in the center in the vehicle width direction is provided at its upper part with a fuel gas suction hole 38 to which the fuel gas pipe 45 is connected, and a reactant gas suction port 32 to which the suction-side manifold 33 is connected.

The voltage converter unit 50 having a substantially rectangular parallelepiped shape is disposed at the center in the vehicle width direction so as to be located between the left-right pair of main frames 2 on the vehicle front side of the fuel cell 30. In addition, the top surface of the voltage converter unit 50 is equipped with radiating fins 50a formed by a method in which a multiplicity of thin plate-like members formed from a metal or the like are erected in the vehicle body front-rear direction.

In order to prevent the running airflow from being blocked by the front wheel WF or the front fork 3 and to prevent the cooling effect of the running airflow from being lowered, each of the left and right radiators 60L and 60R is so disposed that its flat surface part with its radiator core disposed thereat is inclined toward the vehicle body center side, and the radiators 60L and 60R are distributedly mounted on the left and right sides. The secondary battery 51 is disposed between the left and right radiators 60L and 60R, on the vehicle body rear side of the front wheel WF.

Of the vehicle body of the fuel cell powered vehicle 1, most part exclusive of the wheels is covered with a cowling 17 serving as an armor member. The cowling 17 formed from a thin resin plate or the like constitutes the appearance of the fuel cell powered vehicle 1, and has the function of preventing rain, dust, etc. from penetrating into the inside of the vehicle body, the function of straightening the running airflow, and the like function. The cowling 17 is provided with a left-right pair of openings 71 on the vehicle body front side thereof, and a motor-driven fan 70 for forcibly introducing the outside air to the inside of the cowling 17 is disposed substantially at the center of each of the openings 71.

Figure 5:
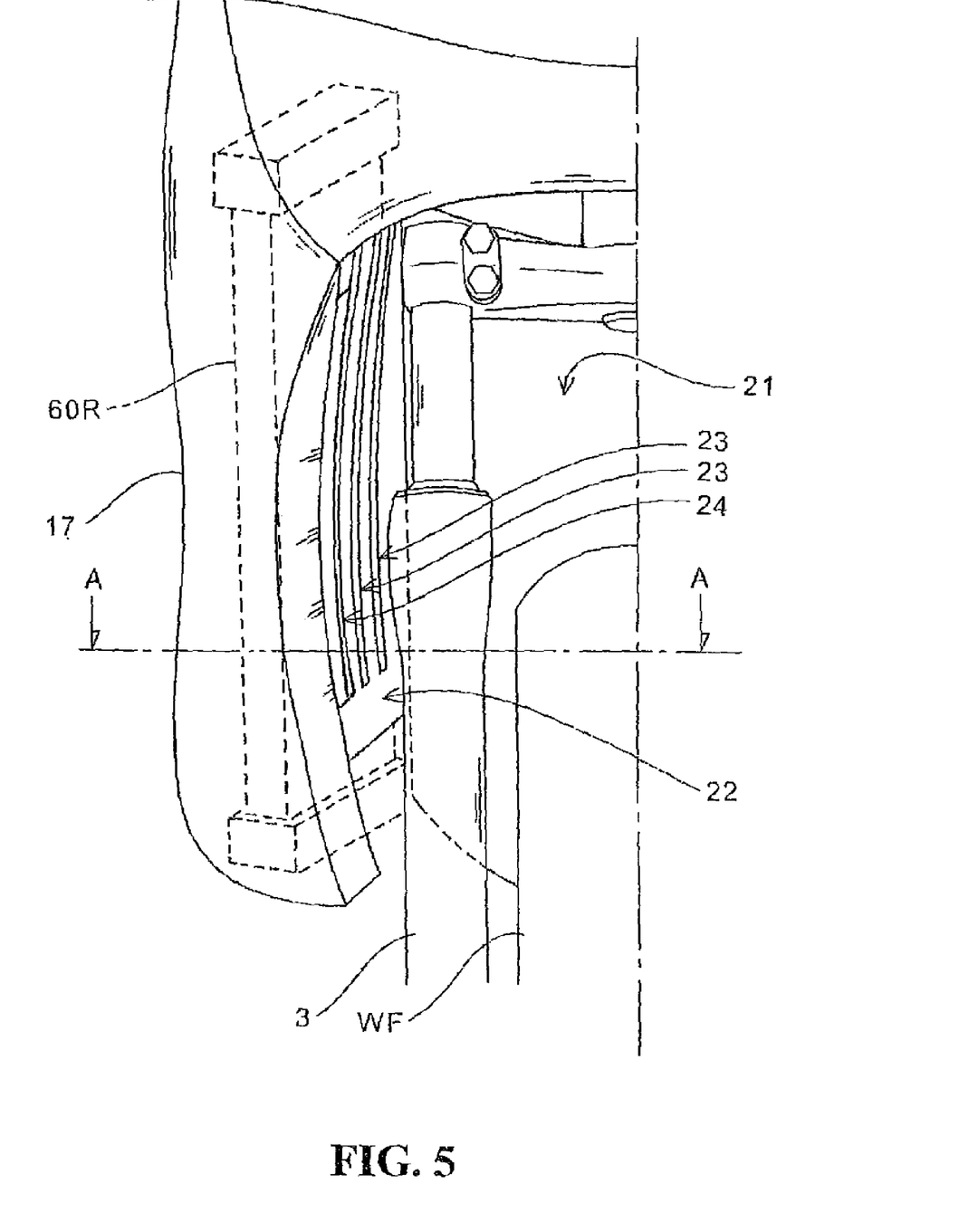
FIG. 5 is a partial enlarged view of FIG. 4.
Figure 6:
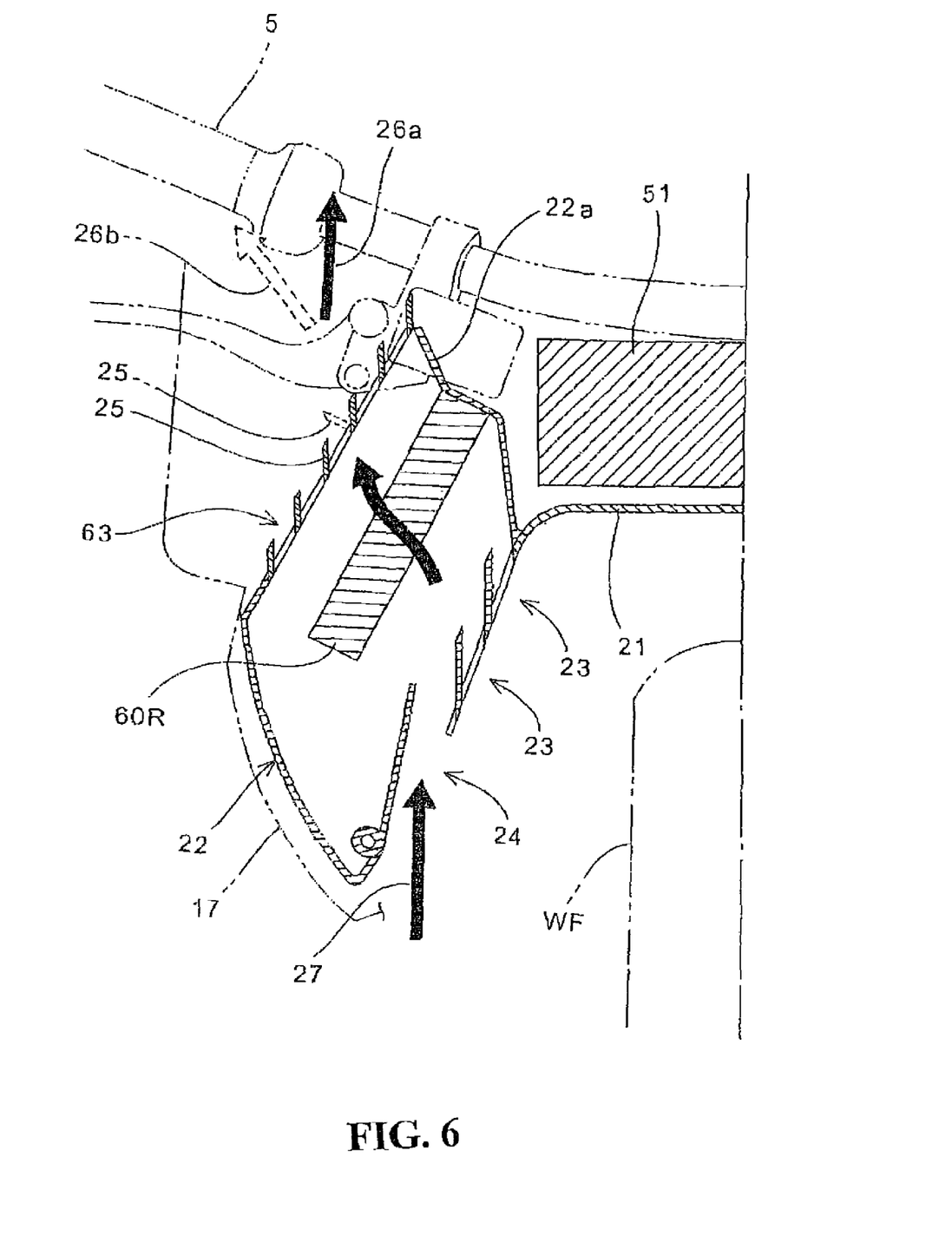
FIG. 6 is a sectional view taken along line A-A of FIG. 5.

FIGS. 5 and 6 are respectively a partial enlarged view of FIG. 4 and a sectional view taken along line A-A of FIG. 5. The same symbols as used above denote the parts which are the same as or equivalent to those shown above. The vehicle front side of the motor scooter type fuel cell powered vehicle 1 is covered with the cowling 17 provided as an armor member.

On the vehicle body rear side of the front wheel WF and the front fork 3, an inner cowl 21 is mounted which is formed from a thin resin plate or the like and which prevents water splashed by the front wheel WF or the like from penetrating into the inside of the vehicle body. Since the cowling 17 and the inner cowl 21 are symmetrically shaped on the left and right sides, only their portions on the right side in the vehicle width direction are shown in FIGS. 5 and 6.

Duct mechanisms 22 are disposed on the inside of the cowling 17. Each of the duct mechanisms 22 provided to be symmetrical on the left and right sides is provided with slits 23, 24 for introducing the running airflow. The slits 23, 24 are located on the outer side in the vehicle width direction of the front wheel WF and the front fork 3, and can introduce the running airflow 27 substantially rectilinearly into the duct mechanism 22.

In addition, the duct mechanism 22 has such a shape as to surround the radiator 60L, 60R, and is fitted with a duct plate 22a on the vehicle body rear side thereof; therefore, substantially the whole of the running airflow introduced through the slits 23, 24 can be made to impinge on the radiator 60L, 60R. The running airflow having passed through the radiator is swiftly discharged to the exterior of the vehicle body through a discharge port 63 fitted with a plurality of louvers 25. Therefore, the resistance to introduction of the running airflow is reduced, and the cooling performance of the radiator is further enhanced.

Incidentally, in this embodiment, the duct mechanisms 22 are in connection with left and right side parts of the inner cowl 21, so that the inner cowl 21 is provided with the function of efficiently guiding the running airflow to the radiators, in addition to the function of protecting the secondary battery 51 from shocks and the function of protecting the secondary battery 51 from water and dust.

In addition, the louvers 25 are of a variable angle type; specifically, the angle of the louvers 25 may be changed by a driving motor or manually, whereby the discharge direction of the running airflow can be changed. This ensures that, on one hand, the running airflow can be made into a discharge airflow 26a toward the driver, whereby the running airflow warmed up by passing through the radiator can be utilized for heating by causing it to impinge on the driver. On the other hand, the running airflow having passed the radiator can also be made into a discharge airflow 26b toward the vehicle body outer side, so as not to impinge on the driver. Incidentally, a configuration may be adopted in which the slits 23, 24 are also fitted with variable-type louvers so that the quantity of the running airflow introduced into the inside of the inner cowl 21 can be controlled as desired.

The secondary battery 51 is disposed on the back side of and adjacent to the thin plate-like inner cowl 21 connecting the left and right duct mechanisms 22 to each other. The presence of the heavyweight bodies such as the fuel cell 30, the hydrogen cylinders 15 at a rear end part of the vehicle body, the swing arm 11 incorporating the driving motor, etc. results in that the vehicle weight tends to be distributed more on the rear wheel side than on the front wheel side. In the fuel cell powered vehicle 1 in this embodiment, however, the secondary battery 51 is disposed rather on the vehicle body front side, whereby it becomes easy to increase the proportion of the vehicle weight distributed on the front wheel side, and the front-rear weight balance of the vehicle body can be enhanced.

In addition, the layout position of the secondary battery 51 according to this embodiment is characterized in that the space secured by distributingly disposing the radiators 60L, 60R on the left and right sides can be effectively utilized, and the secondary battery 51 serving as a heavyweight body is disposed at a vehicle body lower part at the center in the vehicle width direction. As a result, the weight balance in the vehicle width direction is maintained, and the center of gravity of the vehicle body is lowered. Thus, the secondary battery 51 is laid out at a more favorable position.

As has been described above, according to the saddle ride, fuel cell powered vehicle based on the present invention, the radiators 60L and 60R are disposed on the left and right sides on the skew rear side of the front wheel in relation to the vehicle body front-rear direction. Therefore, the running airflow desired to impinge on the radiators is not blocked by the front wheel WF, and the running airflow can be made to efficiently impinge on the radiators. As a result, the cooling performance of the radiators is enhanced, which makes it possible to reduce the size of the radiators while securing the same cooling performance. In addition, that space at the center in the vehicle width direction which is secured by distributingly arranging the radiators on the left and right sides can be effectively utilized as a space in which to dispose the secondary battery.

Incidentally, the shapes of the radiators, the duct mechanisms and the inner cowl, the numbers and shapes of the slits and louvers in the duct mechanisms, etc. are not limited to those in the above-described embodiment, and various modifications are possible. For example, a portion of the running airflow introduced into the duct mechanism may be used for cooling the secondary battery, and louvers capable of changing the airflow direction toward any of the upper, lower, left and right sides may be applied to the louvers in the duct mechanisms.

Figure 7:
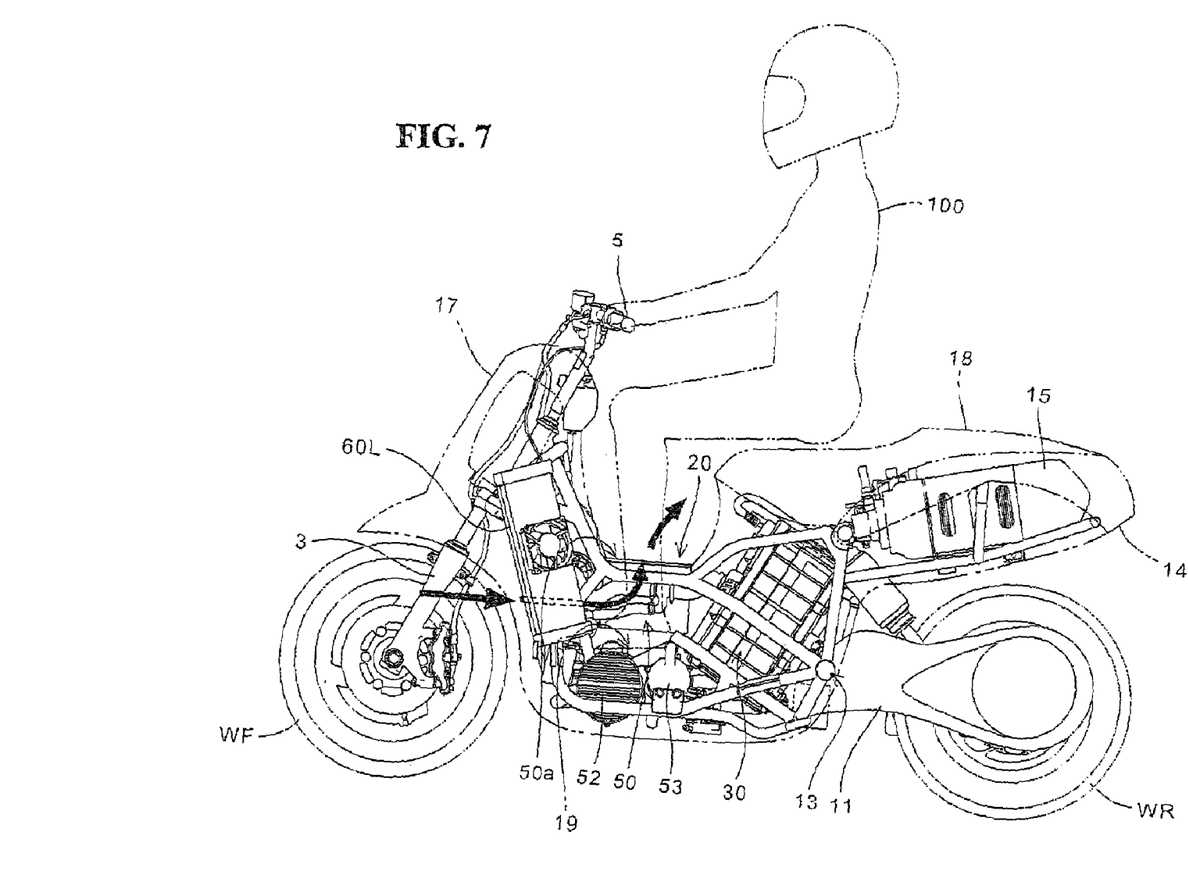
FIG. 7 is a left side view of a fuel cell powered vehicle according to an embodiment of the present invention.
Figure 8:
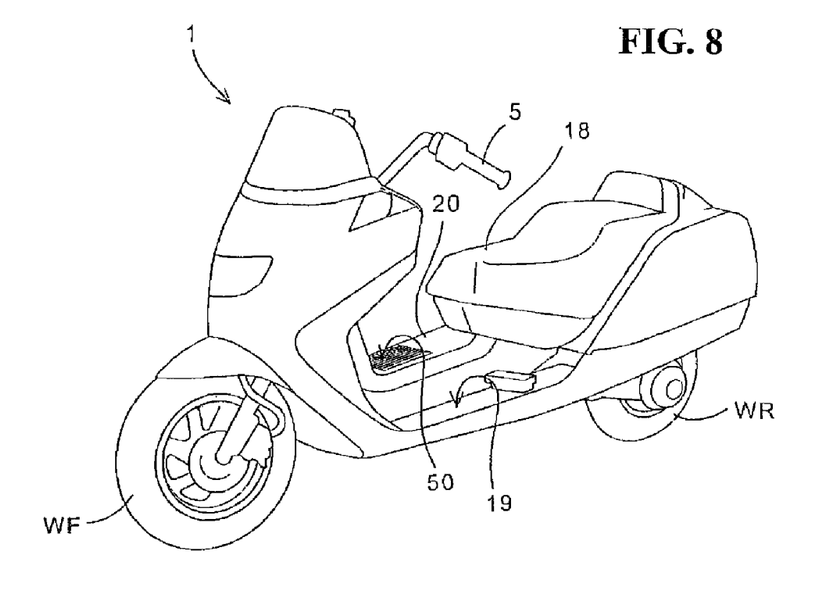
FIG. 8 is a perspective view of a fuel cell powered vehicle according to an embodiment of the present invention.

The embodiment of the present invention will be further described with reference to FIGS. 3 and 7-9. FIG. 3 is a top plan view of the fuel cell powered vehicle 1. FIG. 7 is a left side view of the fuel cell powered vehicle 1, and FIG. 8 is a perspective view showing an example of an armor member of the fuel cell powered vehicle 1.

The fuel cell 30 disposed in the center in the vehicle width direction is provided at its upper part with a fuel gas suction hole 38 to which the fuel gas pipe 45 is connected, and a reactant gas suction port 32 to which the suction-side manifold 33 is connected. The voltage converter unit 50 having a substantially rectangular parallelepiped shape is disposed at the center in the vehicle width direction so as to be located between the left-right pair of main frames 2 on the vehicle front side of the fuel cell 30. In addition, the top surface of the voltage converter unit 50 is equipped with radiating fins 50a formed by a method in which a multiplicity of thin plate-like members formed from a metal or the like are erected in the vehicle body front-rear direction.

Figure 9:
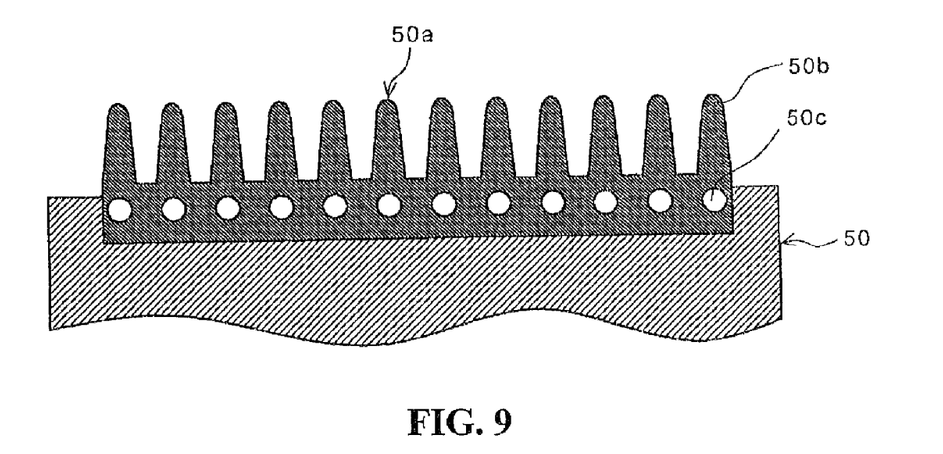
FIG. 9 is a sectional view taken along line A-A of FIG. 3.

FIG. 9 is a sectional view taken along line A-A of FIG. 3. Since the radiating fins 50a configured by disposing the multiplicity of plate-like members 50b in the vehicle body front-rear direction, the direction of the radiating fins 50a coincides with the direction of the running airflow, so that the outside air making contact with the radiating fins 50a can flow easily, whereby the cooling effect can be further enhanced. In addition, base parts connecting the plate-like members 50b to each other are also provided with radiating vent holes 50c extending in the vehicle front-rear direction, so that the area of contact with the outside air is enlarged, whereby the cooling effect on the voltage converter unit 50 is further enhanced.

The voltage converter unit 50 is accommodated in the inside of a straddled part 20 formed between the steering handle 5 for steering the front wheel WF and the seat 18 on which the driver 100 is to be seated. The straddled part 20 which is formed between footrests 19 formed on the left and right sides in the vehicle width direction and which has a top surface one step higher than the footrests 19 is formed to be as low as possible so that it can be easily straddled by the driver when he gets onto and gets off the vehicle, and, therefore, the spacing between the voltage converter unit 50 and the top surface of the straddled part 20 will naturally be small.

Therefore, the voltage converter unit 50 and the radiating fins 50a are placed at positions near the exterior of the vehicle body, whereby the cooling effect on the voltage converter unit 50 can be enhanced. Besides, in this embodiment, the radiating fins 50a are exposed to the vehicle body outer side through a window portion formed in the top surface of the straddled part 20, so that the radiating fins 20 make direct contact with the outside air, whereby the cooling effect can be enhanced more.

In the fuel cell powered vehicle 1 according to this embodiment, the radiators 60L, 60R as heat radiators for the cooling water for cooling the fuel cell 30 are disposed on the inside of the cowling formed from a thin resin plate or the like and serving as an armor member, and the voltage converter unit 50 is disposed between the left and right radiators 60L and 60R. This makes it possible to prevent the warm airflow having passed through the radiator from impinging on the voltage converter unit 50, and to cause the running airflow coming from the vehicle front side to impinge on the voltage converter unit 50 disposed at the center in the vehicle width direction.

Incidentally, the running airflow passing on a lateral side of the voltage converter unit 50 may not only be discharged to the exterior of the vehicle body through the window part of the straddled part on which the radiating fins 50a front but also be utilized for cooling the fuel cell 30 on the vehicle body rear side.

As has been described above, in the fuel cell powered vehicle according to the present invention, the voltage converter unit 50 having the radiating fins 50a is disposed at the straddled part 20 between the steering handle 5 and the seat 18 so that the radiating fins 50a are directed upwards; therefore, the radiating fins 50a are located at a position near the exterior of the vehicle body, so that the cooling effect on the voltage converter unit 50 can be enhanced with a simple configuration. The presence of the heavyweight bodies such as the fuel cell 30, the hydrogen cylinders 15 under the seat, the swing arm 11 incorporating the driving motor, etc. results in that the vehicle weight tends to be distributed more on the rear wheel side than on the front wheel side. In the fuel cell powered vehicle 1 according to this embodiment, however, the voltage converter unit 50 serving as a heavyweight body is disposed at the straddled part 20 located rather on the vehicle body front side, whereby it becomes easy to increase the proportion of the weight distributed on the front wheel side, and the front-rear weight balance of the vehicle body can be enhanced.

Incidentally, the shapes of the voltage converter unit, the radiating fins, the steering handle, the seat, the straddled part, the armor member, etc. are not limited to those in the above-described embodiment, and various modifications are possible. For example, the radiating fins of the voltage converter unit may be so configured that only a part thereof is exposed to the outside of the vehicle body.

In addition, the form of the fuel cell powered vehicle is not limited to a motorcycle and may be a three- or four-wheel vehicle or the like, and various modifications may also be made as to the forms and layout of the component parts such as the fuel cell, hydrogen reserving means, the supercharger, the humidifier, the voltage converter unit, the secondary battery, the radiator, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel cell powered vehicle driven to run by electric power supplied from a fuel cell, said fuel cell powered vehicle comprising:
    a secondary battery for reserving the electric power supplied from said fuel cell and
    a pair of radiators as a heat radiators for cooling water for said fuel cell;
    wherein said two radiators are disposed on left and right sides on a skew rear side of a front wheel in relation to a front-rear direction of a vehicle body, and
    said secondary battery is disposed between said left and right radiators.

2. The fuel cell powered vehicle according to claim 1, wherein a thin plate-shaped inner cowl is disposed between said secondary battery and said front wheel.

3. The fuel cell powered vehicle according to claim 1, said fuel cell powered vehicle further comprises:
    a cowling for covering a front side of said fuel cell powered vehicle; and
    duct mechanisms for surrounding said radiators;
    wherein each of said duct mechanisms has an introduction port and a discharge port for a running airflow, and said duct mechanisms are disposed on left and right sides of said inner cowl and on an inside of said cowling.

4. The fuel cell powered vehicle according to claim 2, said fuel cell powered vehicle further comprises:
    a cowling for covering the front side of said fuel cell powered vehicle; and
    duct mechanisms for surrounding said radiators;
    wherein each of said duct mechanisms has an introduction port and a discharge port for a running airflow, and said duct mechanisms are disposed on left and right sides of said inner cowl and on an inside of said cowling.

5. The fuel cell powered vehicle according to claim 3, wherein said discharge ports are fitted with louvers by which a direction of an airflow discharged to the exterior of the vehicle body after passing through said radiators can be arbitrarily changed between a direction toward a driver of the vehicle and a direction toward an outer side of the vehicle body.

6. The fuel cell powered vehicle according to claim 1, further comprising:
    a voltage converter unit for converting voltage of the electric power generated by the fuel cell to a predetermined voltage;
    a steering handle for steering a front wheel; and
    a seat on which a driver is to be seated;
    wherein a driver straddled part is provided between said steering handle and said seat,
    said voltage converter unit is fitted with radiating fins, and
    said voltage converter unit is accommodated in said straddled part with said radiating fins directed to an upper side of the vehicle body.

7. The fuel cell powered vehicle according to claim 6, wherein said straddled part is formed between left and right footrests on which feet of the driver are to be put, in a vehicle width direction.

8. The fuel cell powered vehicle according to claim 6, wherein said voltage converter unit is disposed between said left and right radiators.

9. The fuel cell powered vehicle according to claim 6, wherein said voltage converter unit is so disposed that said radiating fins are exposed to an exterior of said vehicle body.

10. The fuel cell powered vehicle according to claim 6, wherein said radiating fins are so disposed as to extend in the vehicle body front-rear direction.

11. A fuel cell powered vehicle driven to run by electric power supplied from a fuel cell, said fuel cell powered vehicle comprising:
   a secondary battery for reserving the electric power supplied from said fuel cell; and
   a pair of radiators as a heat radiators for cooling water for said fuel cell;
   wherein said two radiators are disposed on left and right sides on a skew rear side of a front wheel in relation to a front-rear direction of a vehicle body, and
   said fuel cell is disposed under a seat and said secondary battery is disposed between said left and right radiators.

12. The fuel cell powered vehicle according to claim 11, wherein a thin plate-shaped inner cowl is disposed between said secondary battery and said front wheel.

13. The fuel cell powered vehicle according to claim 11, said fuel cell powered vehicle further comprises:
   a cowling for covering a front side of said fuel cell powered vehicle; and
   duct mechanisms for surrounding said radiators;
   wherein each of said duct mechanisms has an introduction port and a discharge port for a running airflow, and said duct mechanisms are disposed on left and right sides of said inner cowl and on an inside of said cowling.

14. The fuel cell powered vehicle according to claim 12, said fuel cell powered vehicle further comprises:
   a cowling for covering the front side of said fuel cell powered vehicle; and
   duct mechanisms for surrounding said radiators;
   wherein each of said duct mechanisms has an introduction port and a discharge port for a running airflow, and said duct mechanisms are disposed on left and right sides of said inner cowl and on an inside of said cowling.

15. The fuel cell powered vehicle according to claim 13, wherein said discharge ports are fitted with louvers by which a direction of an airflow discharged to the exterior of the vehicle body after passing through said radiators can be arbitrarily changed between a direction toward a driver of the vehicle and a direction toward an outer side of the vehicle body.

16. The fuel cell powered vehicle according to claim 11, further comprising:
   a voltage converter unit for converting voltage of the electric power generated by the fuel cell to a predetermined voltage;
   a steering handle for steering a front wheel; and
   a seat on which a driver is to be seated;
   wherein a driver straddled part is provided between said steering handle and said seat,
   said voltage converter unit is fitted with radiating fins, and
   said voltage converter unit is accommodated in said straddled part with said radiating fins directed to an upper side of the vehicle body.

17. The fuel cell powered vehicle according to claim 16, wherein said straddled part is formed between left and right footrests on which feet of the driver are to be put, in a vehicle width direction.

18. The fuel cell powered vehicle according to claim 16, wherein said voltage converter unit is disposed between said left and right radiators.

19. The fuel cell powered vehicle according to claim 16, wherein said voltage converter unit is so disposed that said radiating fins are exposed to an exterior of said vehicle body.

20. The fuel cell powered vehicle according to claim 16, wherein said radiating fins are so disposed as to extend in the vehicle body front-rear direction.

* * * * *